(12) United States Patent
Hars

(10) Patent No.: US 10,944,568 B2
(45) Date of Patent: Mar. 9, 2021

(54) METHODS FOR CONSTRUCTING SECURE HASH FUNCTIONS FROM BIT-MIXERS

(71) Applicant: The Boeing Company, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 174 days.

(21) Appl. No.: 15/726,608

(22) Filed: Oct. 6, 2017

(65) Prior Publication Data

US 2019/0109715 A1   Apr. 11, 2019

(51) Int. Cl.
  *H04L 9/32*   (2006.01)
  *H04L 29/06*   (2006.01)
  *H04L 9/06*   (2006.01)

(52) U.S. Cl.
  CPC .......... *H04L 9/3242* (2013.01); *H04L 9/0631* (2013.01); *H04L 9/0637* (2013.01); *H04L 9/0643* (2013.01); *H04L 63/0428* (2013.01); *H04L 63/123* (2013.01); *H04L 63/08* (2013.01)

(58) Field of Classification Search
  CPC ... H04L 9/3242; H04L 9/0631; H04L 9/0637; H04L 9/0643; H04L 63/0428; H04L 63/123; H04L 63/08
  See application file for complete search history.

(56) References Cited

U.S. PATENT DOCUMENTS

| | | | |
|---|---|---|---|
| 2003/0012382 A1* | 1/2003 | Ferchichi | H04L 63/062 380/270 |
| 2007/0106896 A1* | 5/2007 | Sandberg | H04L 9/0637 713/170 |
| 2008/0232581 A1* | 9/2008 | Elbaz | H04L 9/065 380/42 |

(Continued)

OTHER PUBLICATIONS

Bellare et al., "Keying Hash Functions for Message Authentication," Lecture Notes in Computer Science, vol. 1109, Jun. 1996 (Jun. 1996).

(Continued)

*Primary Examiner* — Shin-Hon (Eric) Chen
*Assistant Examiner* — Jessica J South
(74) *Attorney, Agent, or Firm* — MH2 Technology Law Group LLP

(57) ABSTRACT

Provided is a method and system for producing message authentication tags and a method and system for producing hash values using bit-mixers. The methods include producing a message authentication or hash value by obtaining a message; segmenting, padding by an electronic processor, the message into a number of equal sized message blocks comprising a first message block, one or more subsequent message blocks, and a final message block; performing, by the electronic processor, a first bit-mixing operation on the first message block with an initialization value; performing, by the electronic processor, subsequent bit-mixing operations on the one or more subsequent message blocks and the final message block with a previous message block; and producing, by the electronic processor, the message authentication tag based on the first bit-mixing operation and the subsequent bit-mixing operations, employing a secret key material.

24 Claims, 12 Drawing Sheets

(56) References Cited

U.S. PATENT DOCUMENTS

| | | | | |
|---|---|---|---|---|
| 2009/0285398 A1* | 11/2009 | Liardet | ............... | H04L 9/0625 |
| | | | | 380/277 |
| 2012/0201373 A1* | 8/2012 | Hua | ..................... | H03K 19/21 |
| | | | | 380/28 |
| 2014/0189367 A1 | 7/2014 | Ingimundarson | | |
| 2014/0298038 A1* | 10/2014 | Gauravaram | ........ | H04L 9/0643 |
| | | | | 713/189 |
| 2014/0317407 A1* | 10/2014 | Minematsu | ............ | G06F 21/64 |
| | | | | 713/170 |
| 2016/0380772 A1* | 12/2016 | Gopal | ..................... | G09C 1/00 |
| | | | | 713/170 |

OTHER PUBLICATIONS

Hars, "Information Security Applications of Bit-Mixers," International Association for Cryptologic Research, vol. 20170210:150511, Feb. 2, 2017, pp. 1-6.

Hars, "Hardware Bit-Mixers," International Association for Cryptologic Research, vol. 20170210:150310, Feb. 2, 2017, pp. 1-7.

Extended European Search Report dated Dec. 14, 2018 in cooresponding European Application No. 18198697.7, 8 pages.

* cited by examiner

US 10,944,568 B2

METHODS FOR CONSTRUCTING SECURE HASH FUNCTIONS FROM BIT-MIXERS

FIELD

This disclosure relates generally information assurance and security.

BACKGROUND

In Information Assurance, hash functions and message authentication codes (MACs) can be used to verify that some data gives a message digest, but adversaries cannot reconstruct the message (or equivalent alternatives that produce the same message digest or MAC value). At some applications operation, speed and power consumption is critical, but security requirements are relaxed. Others need high security, long digests. Hash functions and MACs allow one to verify that some input data maps to a given message digest, without allowing an adversary to reconstruct the message (or equivalent alternatives) by knowing only the digest. There are applications, including commercial and military aviation, data centers, personal computers, where either high security levels with appropriately chosen message digest sizes are needed; or the security requirements are relaxed, but the running time and power use is critical. For these applications low-power, very fast hash and MAC functions are needed, but often with the additional requirement of high resistance to side channel attacks.

Currently used hash and MAC functions are inflexible with rigid input and output buffer sizes, they are very slow, consume a lot of power/energy and they by themselves are vulnerable to side channel attacks. The resulting security levels are fixed to a few preset levels, even though many applications in commercial and military aviation need higher levels of security, or better performance than existing solutions.

What is needed are hash and MAC functions that overcome the above-noted deficiencies.

SUMMARY

In accordance with examples of the present disclosure, a computer-implemented method for producing a message authentication tag is provided. The method comprises obtaining a message; segmenting, by an electronic processor, the message into a number of equal sized message blocks comprising a first message block, one or more subsequent message blocks, and a final message block; optionally padding the last message block if necessary, to make the blocks of equal size; performing, by the electronic processor, a first bit-mixing operation on the first message block with an initialization value; performing, by the electronic processor, subsequent bit-mixing operations on the one or more subsequent message blocks and the final message block with a previous message block; and producing, by the electronic processor, the message authentication tag based on the first bit-mixing operation and the subsequent bit-mixing operations. In some examples, the message is a plaintext message or an encrypted message.

In some examples, the method can further comprise encrypting each of the equal sized message blocks with a block encryption algorithm to produce a number of encrypted message blocks.

In some examples, the first message block, the one or more subsequent message blocks, and the final message block are encrypted message blocks.

In some examples, the method can further comprise sending the message authentication tag with the message to a receiver, wherein the message is in plain text.

In some examples, the method can further comprise sending the message authentication tag with the message to a receiver, wherein the message is encrypted.

In some examples, the first bit-mixing operation and the subsequent bit-mixing operations are performed by a bit-mixer construction based on a double-mix Feistel network, a substitution-permutation network, or an XOR tree; or a parallel combination (aggregation) of two or more simple bit-mixer constructions.

In some examples, the first bit-mixing operation and the subsequent bit-mixing operations are performed using a key material. In some examples, the key material is kept secret and the message authentication tag is a message authentication code.

In some examples, the method further comprises performing a final bit-mixing operation with an output of based on the final message block and a concatenation of a length of authentication data and a length of encrypted text blocks; performing an exclusive OR operation with an output of the final bit-mixing operation and an encrypted null counter that is encrypted using the block encryption algorithm, under a secret key.

In accordance with examples of the present disclosure, a computer-implemented method for producing a hash value for a message is provided. The method comprises obtaining the message; segmenting, by an electronic processor, the message into a number of equal sized message blocks comprising a first message block, one or more subsequent message blocks, and a final message block; optionally padding the last message block if necessary, to make the blocks of equal size; performing, by the electronic processor, a first bit-mixing operation on the first message block with an initialization value; performing, by the electronic processor, subsequent bit-mixing operations on the one or more subsequent message blocks and the final message block with a previous message block; and determining, by the electronic processor, the hash value based on the first bit-mixing operation and the subsequent bit-mixing operations. In some examples, the message is a plaintext message or an encrypted message or arbitrary other type of data in electronic format. In some examples, the first bit-mixing operation and the subsequent bit-mixing operations use key material that is public.

In some examples, the method further comprises performing the bit-mixing operation on the last message block that is different from all other bit-mixing operations performed in the hash computation, wherein the difference can be in the construction of the bit-mixer, and/or in its used key material.

In some examples, the method further comprises encrypting each of the equal sized message blocks with a block encryption algorithm to produce a number of encrypted message blocks. In some examples, the first message block, the one or more subsequent message blocks, and the final message block are encrypted message blocks. In some examples, the first bit-mixing operation and the subsequent bit-mixing operations are performed by a bit-mixer construction based on double-mix Feistel network, a substitution-permutation network, or an XOR tree; or a parallel combination (aggregation) of two or more simple bit-mixer constructions.

In accordance with examples of the present disclosure, a computer system is provided that comprises a processor; a non-transitory computer readable medium storing instructions that when executed by the processor, perform a method for producing a message authentication tag, the method comprising: obtaining a message; segmenting, by an electronic processor, the message into a number of equal sized message blocks comprising a first message block, one or more subsequent message blocks, and a final message block; optionally padding the last message block if necessary, to make the blocks of equal size; performing, by the electronic processor, a first bit-mixing operation on the first message block with an initialization value; performing, by the electronic processor, subsequent bit-mixing operations on the one or more subsequent message blocks and the final message block with a previous message block; and producing, by the electronic processor, the message authentication tag based on the first bit-mixing operation and the subsequent bit-mixing operations. In some examples, the first bit-mixing operation and the subsequent bit-mixing operations are performed by a bit-mixer construction based on double-mix Feistel network, a substitution-permutation network, or an XOR tree; or a parallel combination (aggregation) of two or more simple bit-mixer constructions. In some examples, the processor is further operable to perform the method comprising performing a final bit-mixing operation with an output of based on the final message block and a concatenation of a length of authentication data and a length of encrypted text blocks; performing an exclusive OR operation with an output of the final bit-mixing operation and an encrypted null counter that is encrypted using the block encryption algorithm.

In accordance with examples of the present disclosure, a computer system is provided that comprises a processor; a non-transitory computer readable medium storing instructions that when executed by the processor, perform a method for producing a message authentication tag, the method comprising: obtaining a message; segmenting, by an electronic processor, the message into a number of equal sized message blocks comprising a first message block, one or more subsequent message blocks, and a final message block; optionally padding the last message block if necessary, to make the blocks of equal size; performing, by the electronic processor, a first bit-mixing operation on the first message block with an initialization value; performing, by the electronic processor, subsequent bit-mixing operations on the one or more subsequent message blocks and the final message block with the processed previous message block; producing, by the electronic processor, the hash value based on the first bit-mixing operation and the subsequent bit-mixing operations. In some examples, the first bit-mixing operation and the subsequent bit-mixing operations are performed by a bit-mixer construction based on double-mix Feistel network, a substitution-permutation network, or an XOR tree; or a parallel combination (aggregation) of two or more simple bit-mixer constructions. In some examples, the processor is further operable to perform the method comprising: performing the final bit-mixing operation with an output of based on the final message block; performing the final bit-mixing operation with a bit-mixer that is different from all other bit-mixing in the computation of the hash value.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
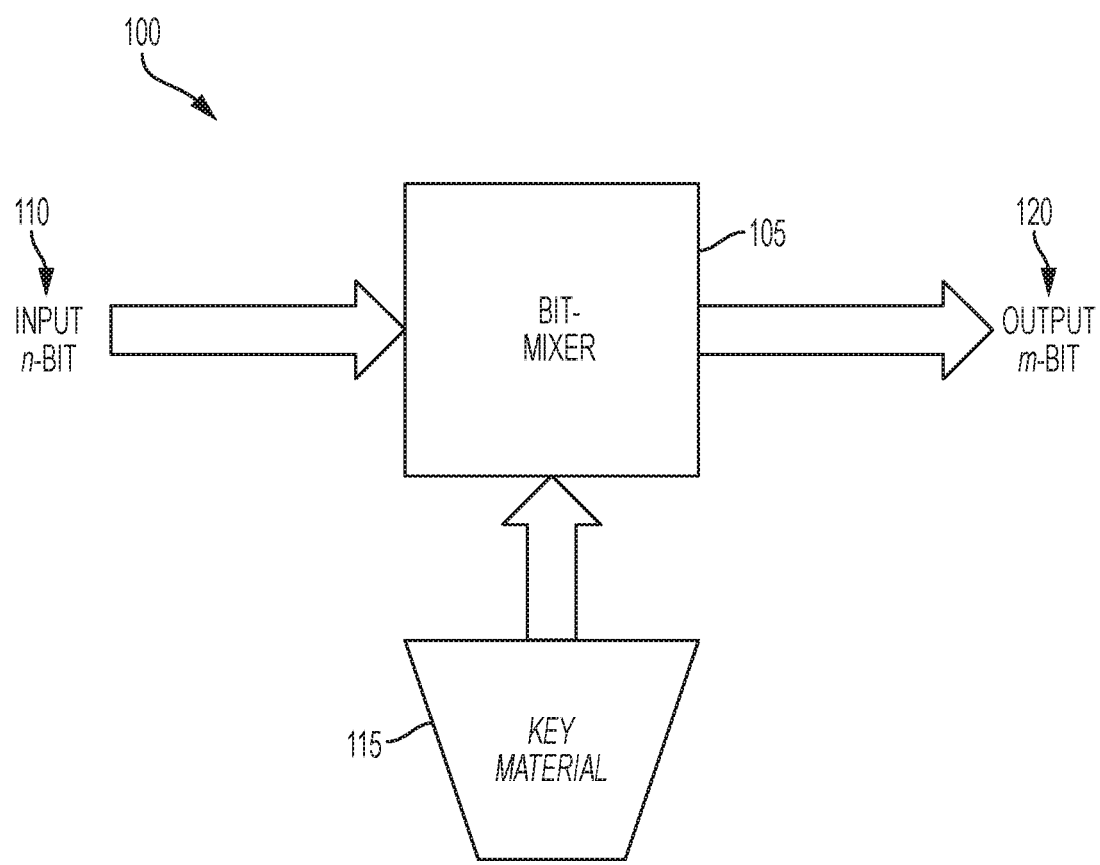
FIG. 1 shows a block diagram 100 for a bit-mixer, according to examples of the present disclosure.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Disclosed herein are hash/MAC function constructions, which are either more secure, and/or orders of magnitude faster than their standard cryptographic equivalents. They consume less power when they are implemented in electronic hardware. These constructions are based on complex constructions of functions, bit-mixers, which are very fast, even though they use large amounts of key material. If the key material is kept secret, we obtain MAC constructions that provide for selectable security levels. If the key material is fixed (hard coded), and made public, the disclosed constructions provide flexible HASH functions. Using them in communication- and computing systems is of low cost, with an insignificant increase of circuit size, and they reduce the power usage. Deployed systems can use slower electronic components, further reducing costs, the energy and power consumption of the computing system, at improved speed and at potentially higher security. Affected systems include scientific and engineering computations, but also security subsystems of flight computers, military and space programs, corporate networks, personal and laptop computers, smart mobile devices, even secure communication networks.

A hash function maps data of arbitrary size to data of fixed size. The values returned by a hash function are called hash values, message digest, data fingerprints, or simply hashes. The desired properties of hash functions include: determinism, uniformity, nonlinearity, which are included in the properties of bit-mixers. One use of hash functions is at data structures, called hash tables, widely used in computer software for rapid data lookup. Hash functions accelerate table or database lookup by detecting duplicated records in a large file. If the hash function depends on a secret key, we have a Message Authentication Code generator: MAC generator.

Hash functions are also used in cryptography. A cryptographic hash function allows one to easily verify that some input data maps to a given hash value, but if the input data is unknown, it is deliberately made difficult to reconstruct it (or equivalent alternatives) by knowing only the hash value. This property is used for assuring integrity of transmitted data in the presence of an active adversary, and is the building block for MACs, which provide message authentication tags. The additional desired properties of such hash functions are: pre-image resistance, second pre-image resistance, and collision resistance. Constructions of arbitrary digest sizes are often needed, to provide exactly the desired security strengths.

Even in the field of information security there are applications, where the requirements for the hash/MAC function can be relaxed, e.g., when neither the input, nor the output of the hash function is accessible to an adversary. It can be the case at random number generators, when a large but fixed number of imperfect entropy sources provide the input of the hash function, which "mixes" them together, and reduces their aggregate size to fit to a fixed buffer. The original entropy has to be preserved as much as possible. (XORing the entropy bits is wasteful, as it reduces the output to a single bit, and it is also imperfect. For example, when the entropy sources get correlated, their effects may cancel by the XOR function, and the corresponding entropy is lost. XOR is an exclusive OR (XOR), also referred to as an exclusive disjunction or a logical XOR operation.

There are other applications, too, where the input is large, but of a fixed size. It has to be reduced to a smaller size, while keeping as much entropy from the input, as possible. For example, at unbalanced Feistel ciphers, used in large-block encryption (Skipjack, XCB . . . ). In these cases a large bit-mixer function can directly be built in electronic hardware. Only the desired number of bits are kept from the output, or the output bits are folded to the desired length by a bitwise XOR operation.

Other applications include checksum-type fingerprints of large data sets, like files. CRC (Cyclic Redundancy Check) algorithms are commonly used to detect random errors in the data. However, CRC algorithms are too simple, e.g. the effects of certain (often randomly occurring) multiple errors may cancel, therefore more complex data integrity checks are desired.

If malicious, intentional changes in the data is not of a concern, only of random errors, we can build integrity checking hash functions from bit-mixers, by using the schemes of cryptographic hash functions. If the bit-mixers are implemented in electronic hardware, the resulting hash/MAC functions are 3 orders of magnitude faster than current standard cryptographic hash functions, albeit at the simplest constructions (using simple bit-mixers) they are less secure, so they cannot replace cryptographic hash functions in every application.

The bit-mixers discussed below can be cascaded (the output of one is the input of the following bit-mixer). At sufficiently many stages the cascaded bit-mixers become a secure cipher. This property allows to trade speed to security. When the bit-mixers are implemented in hardware, at all security levels the resulting performance (speed, power) is still at least an order of magnitude better than existing solutions. The bit-mixers use large amounts of key material, which are divided into chunks of the size of the larger of the input and the output of the most common bit-mixer constructions. They are called "subkeys". If the key material is kept secret, the constructions below provide MAC functions (only with the knowledge of the key material can anyone construct or verify the message authentication code). If the key material is fixed (hard coded), and made public, the constructions below provide HASH functions.

Figure 2:
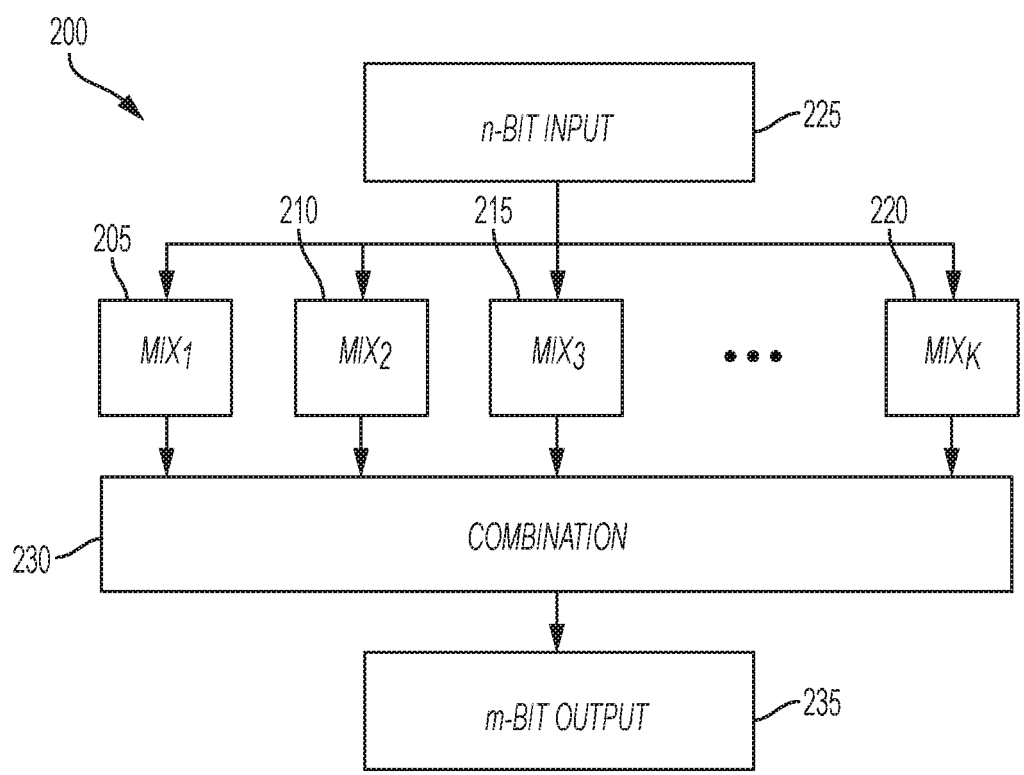
FIG. 2 shows a block diagram 200 for an aggregate bit-mixer, according to examples of the present disclosure.

FIG. 1 shows a block diagram 100 for a bit-mixer, according to examples of the present disclosure. Bit-mixer 105 operates to mix a bit string associated with bits of an n-bit input 110 with key material 115 to produce an m-bit output 120. Generally, bit-mixers, e.g. bit-mixer 105 have the properties:

1. Bit-mixers map n-bit input to n-bit output (n=block size, can be in the thousands for practical implementations)
2. The mixing depends on a large amount of secret key material (which can be generated from a single key or produced by a true random number generator; possibly a combination of these)
3. Every input bit influences every output bit in non-linear way
4. Most nonempty sets of input bits, (which are independently chosen from the key material), also influences every output bit (no effects cancel)
5. Most series of changes of the input yield output without apparent correlation to the input, or to the change pattern of the input In practice, the corresponding bit-mixers need their design to be specified: input, output, and key material. This is referred to as "construction". Multiple bit-mixers can be combined parallel (as opposed to cascaded) to improve the mixing of an input string. FIG. 2 shows a block diagram 200 for an aggregate bit-mixer, according to examples of the present disclosure. Bit-mixers $Mix_1$ 205, $Mix_2$ 210, $Mix_3$ 215, . . . , $Mix_k$ 220 receive the same n-bit input 225 and whose outputs can be combined 230 and outputted 235 as a m-bit output (e.g. with a bit-wise XOR operation). This construction allows to trade circuit size to security. Bit-mixers can also be cascaded (connected in serial, possibly reusing existing electronic circuits), where the output of one is the input of the following bit-mixer. At sufficiently many stages the bit-mixers become a secure cipher. This property allows to trade speed to security. When the bit-mixers are implemented in hardware, at all security levels the resulting performance (speed, power) is still at least an order of magnitude better than existing solutions.

FIGS. 5-8, discussed in detail below, shows specific examples of bit-mixers that can be used as the bit-mixers of FIG. 3 that shows a Galois message authentication code (GMAC)-like construction and FIG. 4 that shows a Merkle-Damgård-like construction, both of which process data blocks sequentially.

Figure 3:
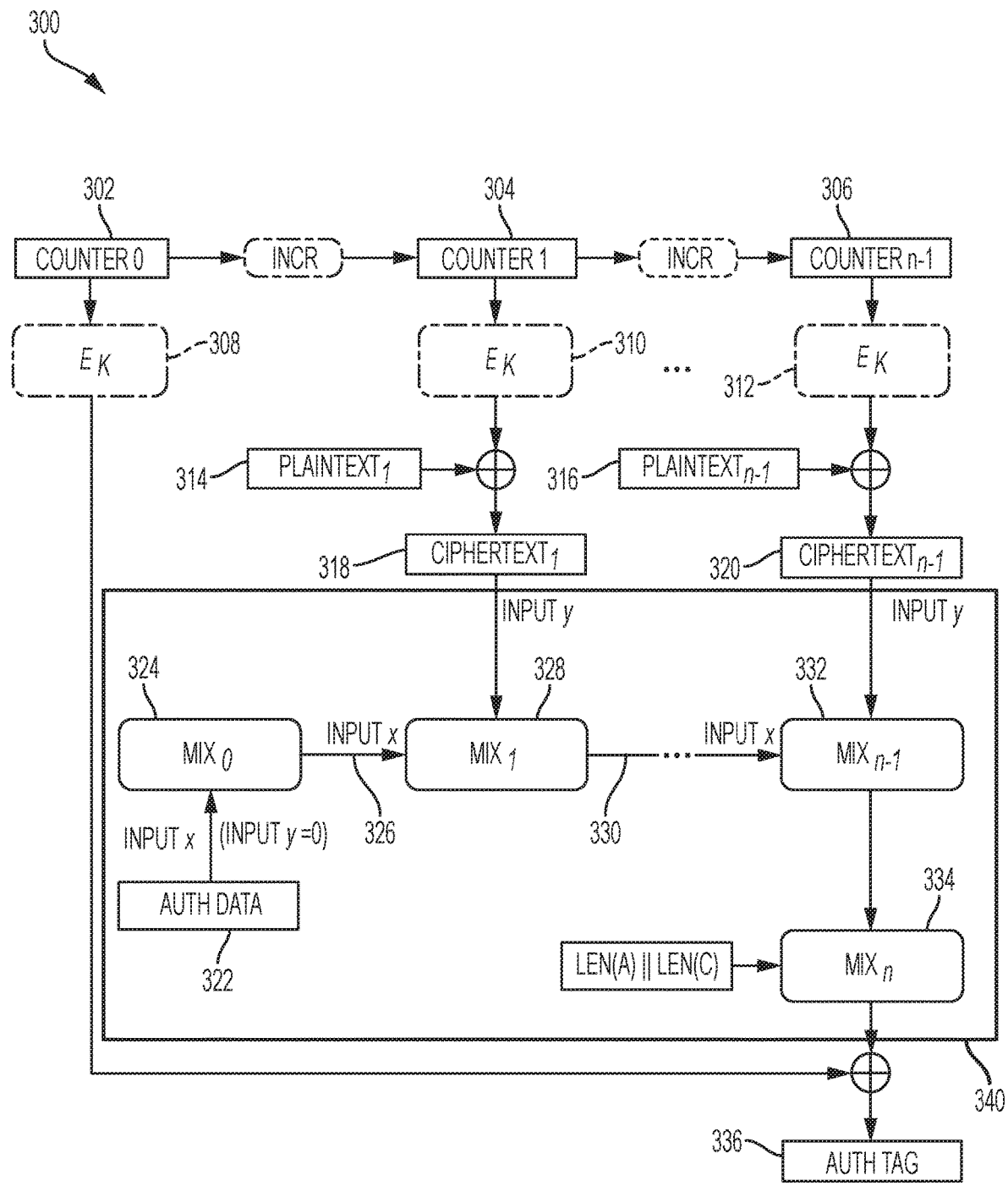
FIG. 3 shows a hash/MAC function according to a Galois MAC (GMAC)-like construction 300, according to examples of the present disclosure.

FIG. 3 shows a hash/MAC function according to a GMAC-like construction 300, as derived from the GCM encryption mode, according to examples of the present disclosure. In counter mode encryption operation, an incrementing counter (counter 0 302, counter 1 304, counter 2 306) is encrypted at 308, 310 312, respectively, using a block cipher and key k, such as AES. The respective counters 302, 304, 306 can be combined, e.g., concatenating with, an initialization vector (IV) to provide additional randomness. The plain text is divided into equal size blocks, plaintext 1 314 and plaintext 2 316, and XORed with encrypted counters 310, 312, respectively, to produce ciphertext 1 318 and ciphertext 2 320, respectively. The hash/MAC function 340 includes authentication data 322 (Auth Data 1) (input x, input y=0) that is inputted in bit-mixer 324, which outputs and provides as input 326 (input x) along with ciphertext 1 318 (input y) to bit-mixer 328. Cipher text 2 320 (input y) and output 330 (input x) of bit-mixer 328 is provided to bit-mixer 332. Bit-mixer 334 receives the output of bit-mixer 332 and a value of concatenation of a length of the data A, which is the data that is only authenticated (not encrypted), and a length of cipher text C (denoted by len(A)||||len(C)). The output of bit-mixer 334 is XORed with the encrypted Counter 0 302 by the cipher $E_k$ 308 to produce an authentication tag 336.

The authentication tag 336 is constructed by feeding blocks of data into the GHASH function and encrypting the result. This GHASH function is defined by $$GHASH(H,A,C)=X_{m+n+1}$$

where H is the Hash Key, a string of 128 zero bits encrypted using the block cipher (AES), A is data which is only authenticated (not encrypted), C is the ciphertext, m is the number of 128 bit blocks in A, n is the number of 128 bit blocks in C (the final blocks of A and C need not be exactly 128 bits), and the variable $X_i$ for i=0, m+n+1 is defined as $$X_i = \begin{cases} 0 & \text{for } i = 0 \\ M_H(X_{i-1} \| A_i) & \text{for } i = 1, \ldots, m-1 \\ M_H(X_{m-1} \| A_m^* \| 0^{128-v}) & \text{for } i = m \\ M_H(X_{i-1} \| C_{i-m}) & \text{for } i = m+1, \ldots, m+n-1 \\ M_H(X_{m+n-1} \| C_n^* \| 0^{128-u}) & \text{for } i = m+n \\ M_H(X_{m+n} \| len(A) \| len(C)) & \text{for } i = m+n+1 \end{cases}$$

where M is a simple or aggregate bit-mixer with key material H: $f(x,y)=M_H(x\|y)$, v is the bit length of the final block of A, u is the bit length of the final block of C, || denotes concatenation of bit strings, and len(A) and len(C) are the 64-bit representations of the bit lengths of A and C, respectively. Note that this is an iterative algorithm: each $X_i$ depends on $X_{i-1}$ and only the final $X_i$ is retained as output.

Figure 4:
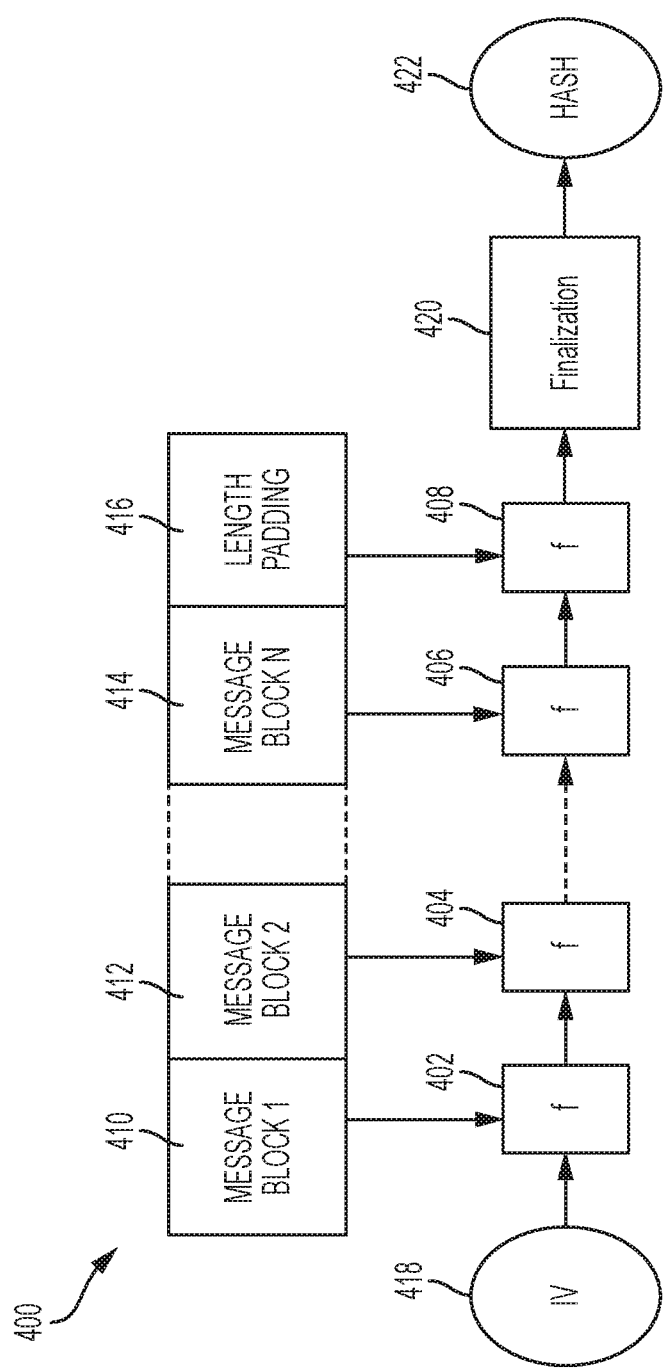
FIG. 4 shows a hash/MAC function according to a Merkle-Damgård-like construction 400, according to examples of the present disclosure.

FIG. 4 shows a hash/MAC function according to a Merkle-Damgård-like construction 400, according to examples of the present disclosure. The Merkle-Damgård-like construction 400 uses a secure compression function $f$ 402, 404, 406, 408, where the input is larger than its output. Although numbered differently, each function $f$ 402, 404, 406, 408 is of the same type. In some examples, the functions $f$ 402, 404, 406, 408 can be implemented by invertible bit-mixers, with half of their output bits discarded (or folded to the other half by a bitwise XOR operation). In some examples, the first subkey of the bit-mixer, e.g., $f$ 402, can be treated as an input, which makes the bit-mixer a compression function, without modifying its output. The plaintext is divided into n-number of equal size blocks, message block 1 410, message block 2 412, . . . , message block n 414. Additional padding bits (length padding 416) can be added to the last block, e.g., message block n 414 if needed. The first function, e.g., $f$ 402 receives as input an initialization vector (IV) 418 and message block 1 410. The final function, e.g., $f$ 408 produces output (finalization 420), which is then hashed by a hash function to produce the hash 422.

The function $f$ 402, 404, 406, 408 has 2 inputs x and y of fixed size (length in bits) and computes the output z. IV is either a fixed constant, or some personalization value, which changes the final hash value as certain applications require. Formally, $z_1=f(IV, B_1)$ and $z_{i+1}=f(z_i, B_{i+1})$ for i=1 . . . n. The hash value is $F(z_{i+1})$, with a given finalization function F.

The GHASH function is an instantiation of the Merkle-Damgård construction, with some modifications. The message portioned into two parts: A and C. The padding scheme is explicitly defined where IV=0 and $f(x,y)=f_H(x,y)=(x \oplus y) \cdot H$, with an extra input, the constant H, called the "hash key". The finalization function has also an extra input $(E_K)$: $F(x)=x \oplus E_K$.

Figure 5:
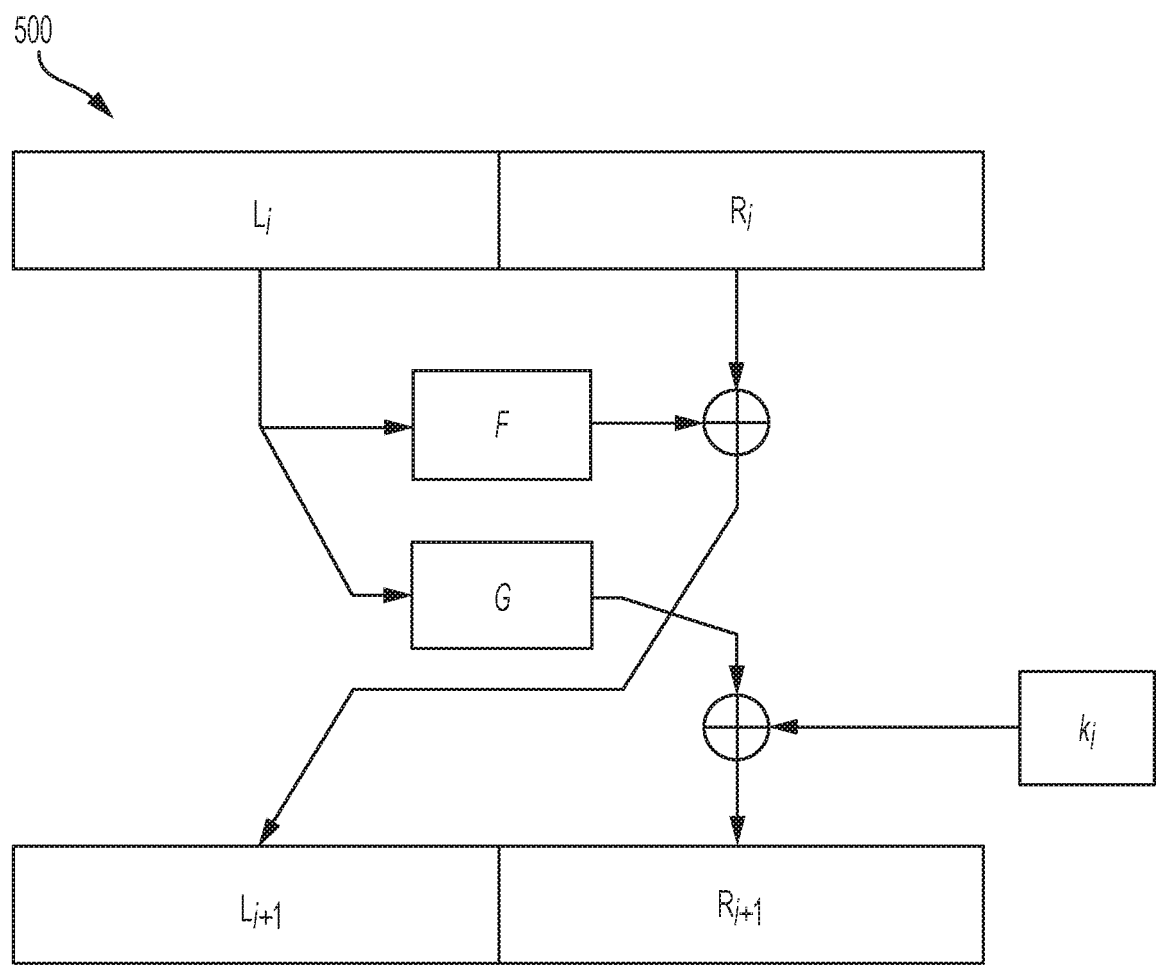
FIG. 5 illustrates one round of a double-mix Feistel network (DMFN) 500 that can be used as the bit-mixer of FIGS. 3 and 4, in accordance with example implementations of the present disclosure.

FIG. 5 illustrates one round of a half-length keyed double-mix Feistel network (DMFN) 500 that can be used as the bit-mixer of FIGS. 3 and 4, in accordance with example implementations of the present disclosure. In DMFN, the block size can be the larger one of the input and the output sizes, by repeating input bits or folding output bits as required for compressing or expanding bit-mixers. Specifically the data is handled in two halves L and R. In every round, Round$_i$, two functions F and G compute $L_{i+1}$, $R_{i+1}$ from $L_i$ and $R_i$. The very first inputs $L_0$ and $R_0$ are set to the input of the bit-mixer while the very last values $L_r$, $R_r$ constitute the output. While $L_{i+1}$ is generated using a bitwise XOR operation of the output of F and $R_i$, a round key $k_i$ is mixed-in using a bitwise XOR operation with the output of G to generate $R_{i+1}$ as follows. For the DMFN, the updated left half ($L_{i+1}$) and updated right half ($R_{i+1}$) may be calculated for each round i=0, 1, . . . , r−1:

$$L_{i+1}=F(L_i) \oplus R_i$$

$$R_{i+1}=G(L_i) \oplus k_i$$

In the preceding, the first inputs $L_0$ and $R_0$ are set to the input of the bit-mixer while the last values $L_r$, $R_r$ constitute the output, F and G represent first and second round functions, and $k_i$ represents the round key. The output at round r−1 may be updated block of data ($L_r$, $R_r$).

In the case of the Feistel network and/or DMFN of example implementations, the round function (F) may be a nonlinear function. The function may or may not be invertible, although the inverse should (but need not) be hard to compute (one-way function) in instances in which the first function is invertible. The security of the scheme may rely on the secrecy of the round key $k_i$, and on the requirements on F, that it is nonlinear and either has no inverse or has one that is hard to compute. The function may in some examples depend on the round (e.g., $F_i$), although in other examples, the first function may be independent of the round.

One example of a suitable round function (F) includes a plurality of logical NAND operations each of which is for a respective pair of shifted versions of the input left half, and a logical XOR for the respective outputs of the NAND operations. In the context of three NAND operations, the first function may include the following: a first NAND operation for a first pair of shifted versions of $L_i$, a second NAND operation for a second pair of shifted versions of $L_i$; a third NAND operation for a third pair of shifted versions of $L_i$; and a XOR operation for the respective outputs of the first, second and third NAND operations. In hardware implementations, these shifts or rotations may not consume time as they may be simply implemented with wirings. Thus, the first function may only require the time of two XOR gate delays, plus the delays of the two input NAND gates (although AND or NOR gates work equally well), which with optimized cell libraries, may be the time equivalent of four NAND2 gate delays. As used herein, a NOR gate is one which implements a Not-OR, a Negative-OR, or a Negated-OR logical function.

In the case of the DMFN, the second round function (G) may be invertible, although its inverse need not be easily computable. Similar to the first function (F), the second function may in some examples depend on the round (e.g., $G_i$), although in other examples, the second function may be independent of the round (the same in every round).

In some examples, a layer of nonlinear substitution boxes (s-boxes) may be used for the second function (G), which may make its mapping nonlinear. In other examples, the second function may perform circular shifts or rotations of the left half, which may then be mixed together and with the round key to calculate the updated right half. In a more particular example, the second function may produce three circular-shifted versions of the left half, and each three bits at the same positions of which may be XOR-ed together and with the bit of the round key in this position to produce a bit of the resulting, updated right half. In this regard, it may be shown that at block lengths=$2^n$ (where n is a positive integer), XORing any three circular shifted versions of the data defines an invertible function. Similar to the first function, in hardware implementations, these shifts or rotations may not consume time as they may be simply implemented with appropriate wirings. Thus, the second function and mixing operations may only require the time of two XOR gate delays, each of which with optimized cell libraries, may have the time equivalent of 1.5 to 3 NAND2 (2-input NAND) gate delays.

If an invertible bit-mixer, is needed, G (or every $G_i$) must to be an invertible function. The inverse of G need not easily be computed unless the inverse of the bit-mixer is also needed. As such it can be faster than typical nonlinear, invertible S-Box layers. An example of such a function G would be to XOR each input bit of G with two input bits from given circular distances ($d_1$, $d_2$). At power-of-two block lengths, when the output bits are computed as the XOR of 3 input bits from given circular distances, an invertible function is obtained. For hardware implementations, if $d_1$ and $d_2$ are not large such that the necessary routing is not excessively long, computing the function G and XOR-ing the round key takes minimal time.

If a nonlinear bit-mixer is needed, F must be a nonlinear function. F does not have to be invertible as its inverse is not needed even for the inverse of the bit-mixer, in the reverse direction. In one example implementations, a fast, sufficiently complex construction is used, which is nonlinear in the Galois field of binary polynomials, as follows:
1. NAND two shifted versions of $L_i$ from circular distances $d_3$ and $d_4$
2. NOR two other shifted versions of $L_i$ at circular distances $d_5$ and $d_6$
3. NAND two yet other shifted versions of $L_i$ at circular distances $d_2$ and $d_5$
4. XOR the above three blocks of bits to $L_i$ In hardware implementations, shifts are essentially free consuming little time. As such, F and G are nearly equal in path length requiring only a moderate amount manual effort to balance the critical timing paths, for reduced side channel leakage. It might be possible for F and G to be different in certain if not all rounds, or we can keep them the same in all rounds in our implementations.

Note that having an invertible function G, the DMFN is invertible: $L_i$ can be computed from bottom up, i.e. from $R_{i+1}$ $L_i$ can be computed, knowing the round key $k_i$ and the inverse of G. Having $L_i$, $F(L_i)$ can be computed, which is XOR-ed to $L_{i+1}$ to yield $R_i$. Invertibility is often a useful property. It ensures that all possible output values occur, and no two different input values gives the same output.

As described previously and shown on FIG. 5, half-length subkeys $k_i$ are mixed-in each round with G. We found no noticeable mixing improvements with subkeys of the full block length, e.g. if another half-length subkey was mixed-in with $R_i$, as shown on FIG. 6. Nevertheless, the constructions are different, and suitable for different applications.

Figure 6:
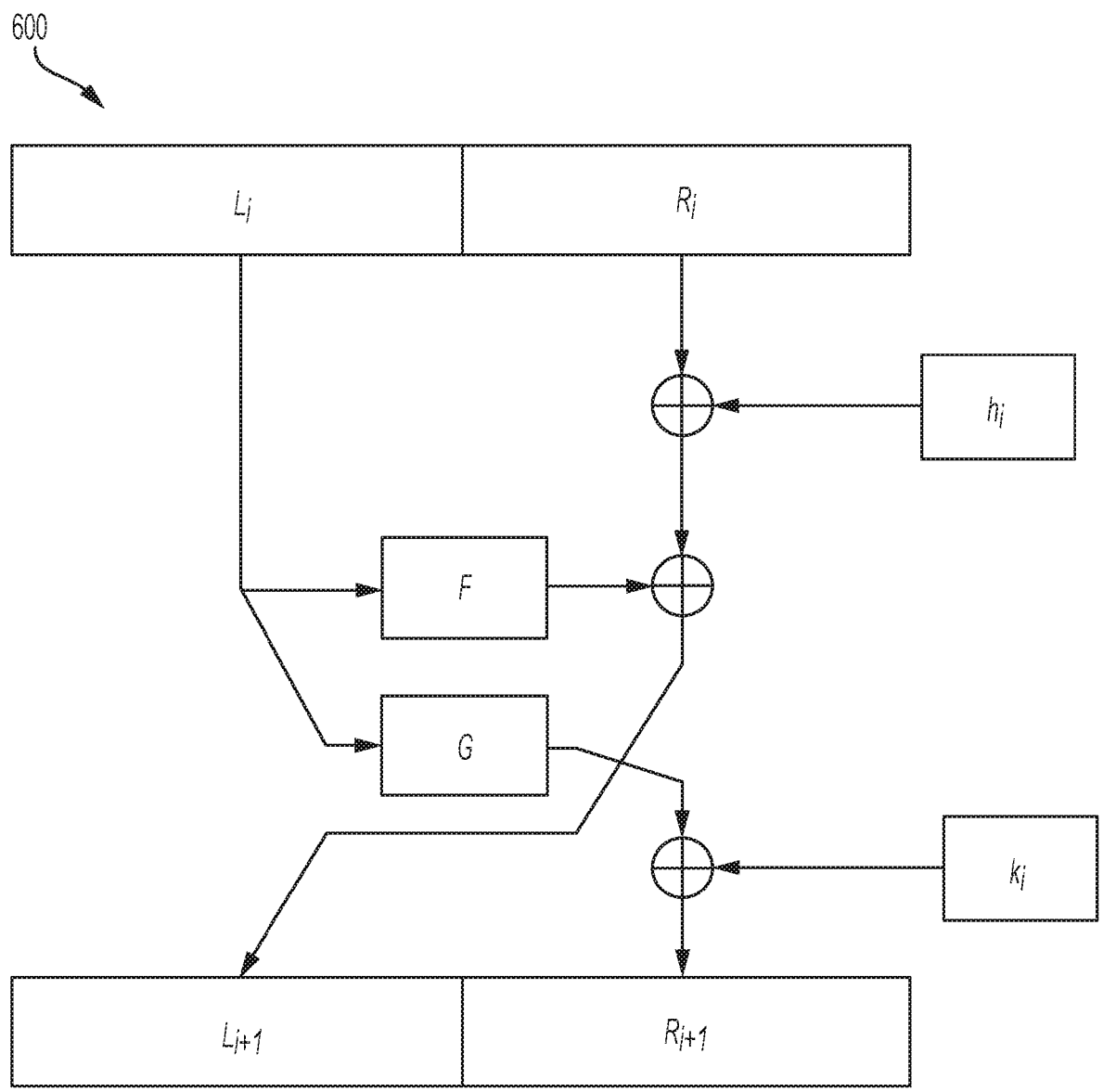
FIG. 6, which illustrates one round of a DMFN 600 that can be used as the bit-mixer of FIGS. 3 and 4, in accordance with these other example implementations.

Reference is now made to FIG. 6, which illustrates one round of a DMFN 600 that can be used as the bit-mixer of FIGS. 3 and 4, in accordance with these other example implementations. In the DMFN, by applying the round key $k_i$ to alter $R_{i+1}$ instead of $L_{i+1}$, the work calculating the two halves may be balanced. That is, the two halves may become available in the same time. But $R_i$ may be unused while the first function (F) is applied. Thus, as shown in FIG. 6, $R_i$ may be mixed with another round key $h_i$ without upsetting the balance. And both $R_{i+1}$ and $L_{i+1}$ may be influenced by key material. The DMFN shown in FIG. 6 may achieve better overall mixing properties when functions of similar complexity are chosen for the first function (F) and second function (G). In yet other examples such as in instances in which the second function is slower to calculate than the first function, the mixing in of $k_i$, may be omitted, which may result in a scheme similar to the DMFN shown in FIG. 5 in mixing properties, but slightly faster. For the DMFN, the updated left half ($L_{i+1}$) and updated right half ($R_{i+1}$) may be calculated for each round l=0, 1, . . . , r−1:

$$L_{i+1}=F(L_i)\oplus R_i\oplus h_i$$

$$R_{i+1}=G(L_i)\oplus k_i$$

In the preceding, the first inputs $L_0$ and $R_0$ are set to the input of the bit-mixer while the last values $L_r$, $R_r$ constitute the output, F and G represent first and second round functions, and $k_i$ and $h_i$ represent round keys. The output at round r−1 may be the output of the bit-mixer, the updated block of data ($L_r$, $R_r$).

Invertible versions of bit-mixers based on the well-known substitution-permutation networks can also be used. Similar to the Feistel network and DMFN, the substitution-permutation network of example implementations may be performed in iterations (or rounds). For example, for a round (i), an input block of data ($D_i$) may be mixed (e.g., XOR-ed) with a round key ($k_i$), and the result may be mixed through a substation layer including a plurality of S-boxes ($S_i$), and a linear transformation layer including a permutation ($P_i$), to produce an updated block of data ($D_{i+1}$). In another example, the input block of data may be first mixed through the substitution and linear transformation layers to produce the updated block of data, which may then be mixed with the round key ($k_i$). In either example, either or both of the S-boxes and permutation may depend on or be independent of the round. And in some examples, at least two of the S-boxes for at least one of the rounds may be different. In one example implementation, the initial block of data ($D_0$) may be only a subset of a larger block of data that also includes at least one other subset ($B_0$). The round key ($k_i$) may be mixed (e.g., XOR-ed) with the other subset ($B_0$) to produce a mixed round key, and it may be mixed with the input block of data ($D_i$) for the round. Or in another example, the round key may be mixed with the other subset, and the resulting mixed round key may be mixed with the updated block of data ($D_{i+1}$) after the substitution and linear transformation layers.

Figure 7:
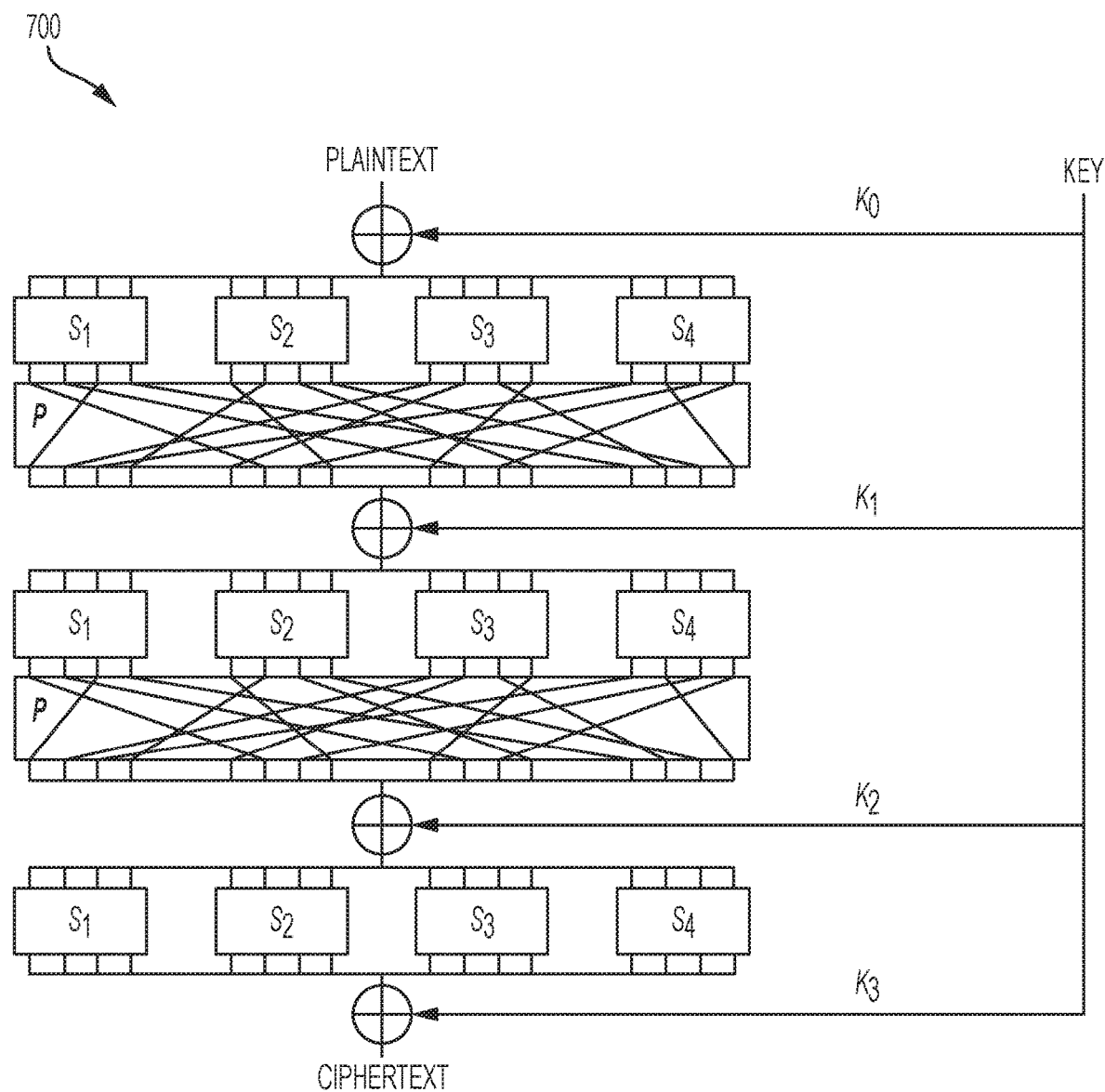
FIG. 7 illustrates three rounds of a substitution-permutation network 700 that can be used as the bit-mixer of FIGS. 3 and 4, in accordance with example implementations of the present disclosure.

FIG. 7 illustrates three rounds of a substitution-permutation network 700 that can be used as the bit-mixer of FIGS. 3 and 4, in accordance with example implementations of the present disclosure. Invertible versions of bit-mixers based on the well-known substitution-permutation networks can be used. For compression or expansion variants, the block size is chosen to be the larger of the desired input and output block sizes. If the input size is smaller, the unused input bits can be kept constant or repeated input bits used until it matches the output size. If the required output size is smaller, we can discard output bits or fold certain bits together via XOR or other appropriate function to produce the final output. Substitution-Permutation (SP) networks are customarily built according to FIG. 7 with several iterations of the following 3 steps:

1. The input is transformed by a series of nonlinear functions, S-Boxes
2. The bits of the result are rerouted/permuted
3. The permuted data is XOR-ed with a round key/subkey
Note: The first and last round are often simplified, omitting one or two steps If the S-Boxes are invertible, the SP Network is invertible. If the S-Boxes are nonlinear, the SP network is nonlinear. SP networks can be arbitrarily wide where the number of rounds required for a thorough mixing depends on its width. In hardware implementations, small S-Boxes tend to yield faster bit-mixers. The smallest practical S-Box, one with 3 input bits and 3 output bits, is implemented in PRINTcipher, as described by Lars Knudsen, Gregor Leander, Axel Poschmann, Matthew J. B. Robshaw. PRINTcipher: A Block Cipher for IC-Printing. Cryptographic Hardware and Embedded Systems, CHES 2010 Volume 6225 of the series Lecture Notes in Computer Science, pp 16-32. The three output bits of this 3×3 S-Box are defined as follows:

$$F0 = AB'C' + A'(C+B)$$

$$F1 = A'BC + B'(C'+A)$$

$$F2 = ABC' + C(B'+A')$$

Figure 8:
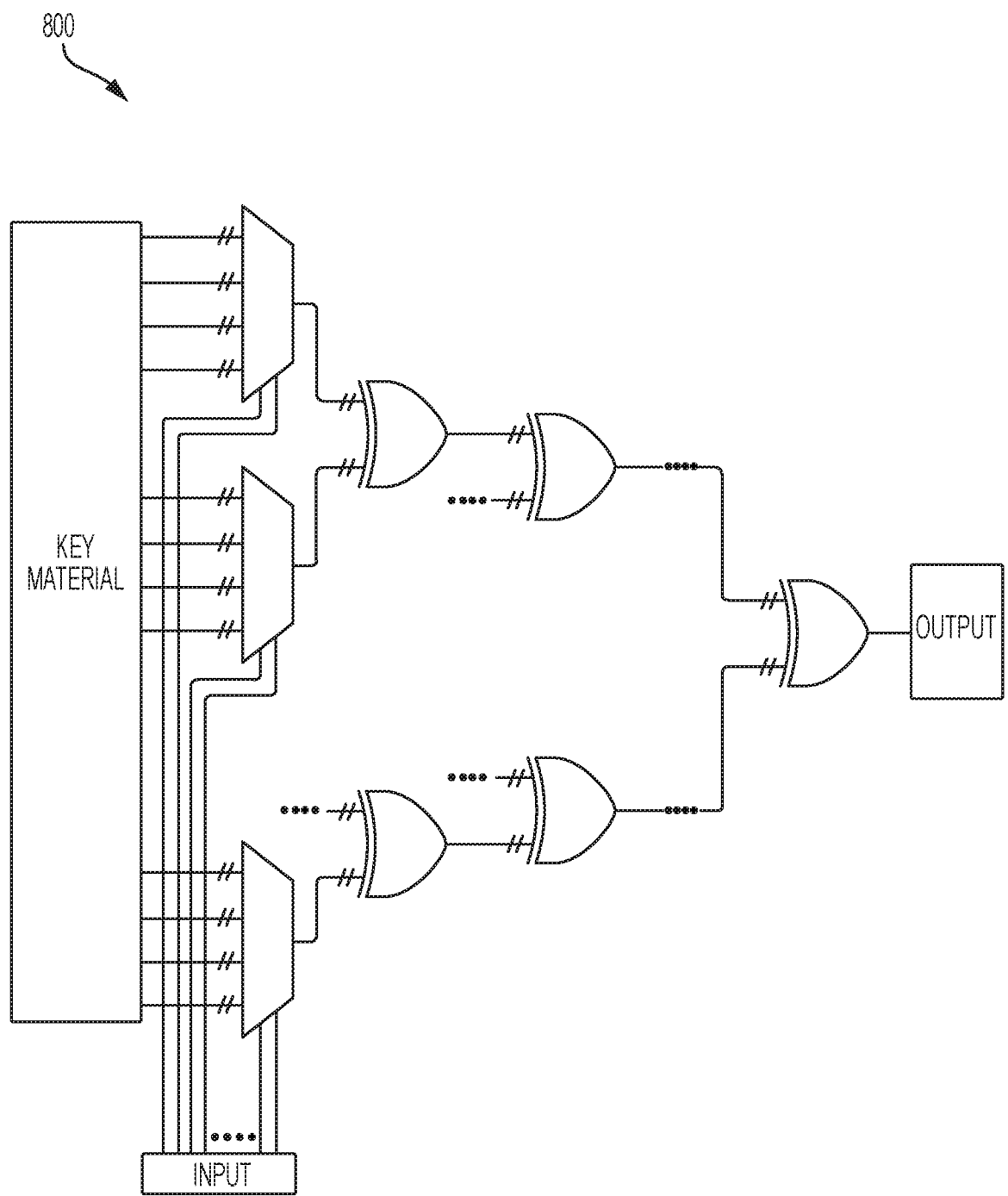
FIG. 8 illustrates an XOR tree 800 that can be used as the bit-mixer of FIGS. 3 and 4, in accordance with various example implementations.

FIG. 8 illustrates an XOR tree 800 that can be used as the bit-mixer of FIGS. 3 and 4, in accordance with various example implementations. In accordance with examples using an XOR tree, the mixing function may be based on a secret random fixed data set, the key material and the input block of data. In this regard, the sub-keys may be blocks of secret random numbers in a sequence of blocks at positions corresponding to those of certain bits in the input block of data, such as those bits select the corresponding sub-keys (using, e.g. multiplexer circuits). The sub-keys may then be mixed together using an XOR tree.

As shown in FIG. 8, the XOR tree 800 may include a plurality of XOR logic gates that may be implemented to carry out a data merger operation. In FIG. 8, each of the logic gates represents a series of gates, one for each bit of the subkeys on which they operate.

In XOR-tree based bit-mixers, the input is partitioned into multiple, arbitrary length, non-empty sets of consecutive bits, forming bit groups. The bits from each group select a subkey from the key material using multiplexers, the outputs of which are bitwise XOR-ed together to generate the final bit-mixer output. While the XOR operation is typically implemented using a tree of 2-input XOR gates in ASICs, multi-input gates or parity generation circuits can be used depending on the target technology, e.g. in FPGAs that provide wide lookup tables. Bit-mixers of this construction are not only straightforward to implement, but offer high performance, low power consumption, improved security, and a minimal side channel attack surface.

As the width of the input and the width of the output of XOR-tree based bit-mixers can be independently chosen, expansion and compression functions are created by selecting a longer output width or longer input width, respectively. Having random key material, any single input bit change will cause the output to change by a random subkey. As such, every output bit is influenced by any input bit change. Further, given the bit-mixers construction, multiple input bit changes will cause the output to change by an XOR-ed aggregation of random subkeys which is in itself random. In total, XOR-tree based bit-mixers satisfy each of the desired properties discussed above and ensures theoretically perfect mixing.

The XOR-tree construction is linear in a binary Galois field, because it only uses bit selection and XOR operations. In these constructions some 4-way correlations exist among certain output values computed from simply correlated input values. In this instance, correlations arise as follows. Assuming at least 2 input bit-groups, choose a bit b from one of the input bit-groups B, and bit c from a different input bit-group C. Holding all bits of group B except b constant, let K0 denote the subkey selected when b is logic 0 and K1 denote the subkey selected with b is logic 1. Similarly, let L0 and L1 denote the subkeys selected based on the logical value of c while other bits of group C are held constant. Finally, let M denote the XOR of all subkeys selected by other input bit-groups where their inputs are held constant (0 if there is no more bit-group). The XOR of the output values resulted from all possible 2×2 values of b and c will yield 0, what we call a "4-way correlation".

$$(M \oplus K0 \oplus L0) \oplus (M \oplus K1 \oplus L0) \oplus (M \oplus K0 \oplus L1) \oplus (M \oplus K1 \oplus L1) = 0$$

In applications where the output values cannot be observed, this type of correlation does not pose problems to the security of the circuit. For applications where this correlation is a concern, the output can be further processed by a nonlinear function such as: A parallel collection small nonlinear functions such as S-Boxes; The outputs of a collection of nonlinear functions such as S-Boxes XOR-ed with the original output; Rotate-Add-XOR (RAX) constructions (suitable for microprocessor implementations). Another way to make the construction nonlinear, is to replace the XOR operations in one or more levels of the XOR-tree with k-to-1 nonlinear S-Boxes similar to the one shown in FIG. 7. While straightforward to implement, the additional uneven circuit delay may require manual signal propagation balancing for low side channel leakage. With moderate effort, replacing one level of the XOR-tree with S-Boxes achieves single clock cycle operation at clock rates upwards of 1.0 GHz.

Figure 9:
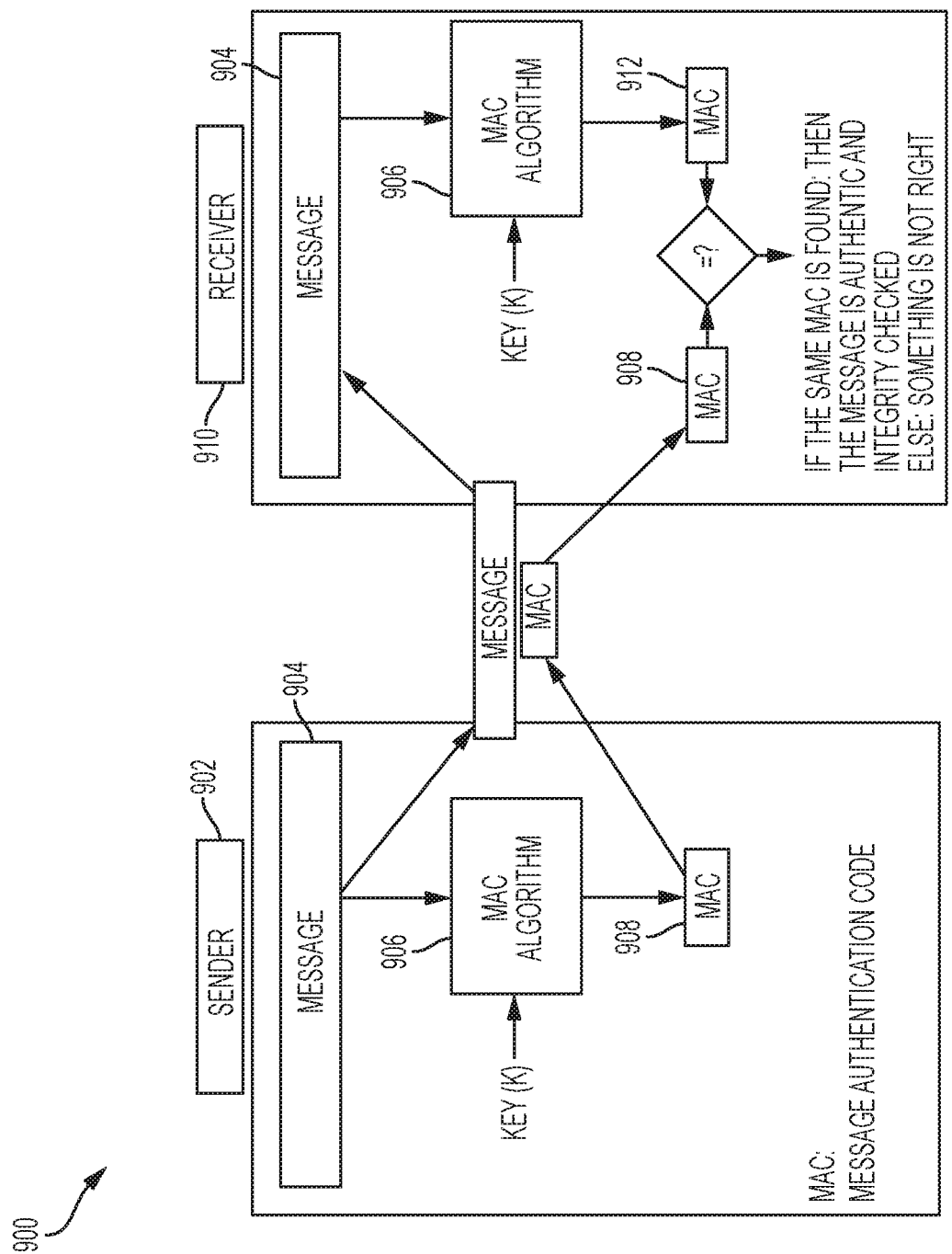
FIG. 9 illustrates a system 900 for message authentication that can use the construction of FIGS. 3 and 4, according to examples of the present disclosure.

FIG. 9 illustrates a system 900 for message authentication that can use the construction of FIGS. 3 and 4, according to examples of the present disclosure. Sender 902 of message 904 runs it through a MAC algorithm 906, e.g., the GMAC-like construction of FIG. 3 or the Merkle-Damgård-like construction of FIG. 4 with secret keys incorporated in the first and last message blocks, to produce MAC data tag 908. Message 904 and MAC tag 908 are then sent to receiver 910. Receiver 910 in turn runs the message portion of the transmission through the same MAC algorithm 906 using the same key, producing second MAC data tag 912. Receiver 910 then compares the first MAC tag 908 received in the transmission to the second generated MAC tag 912. If they are identical, receiver 910 can safely assume that the message was not altered or tampered with during transmission (data integrity).

Figure 10:
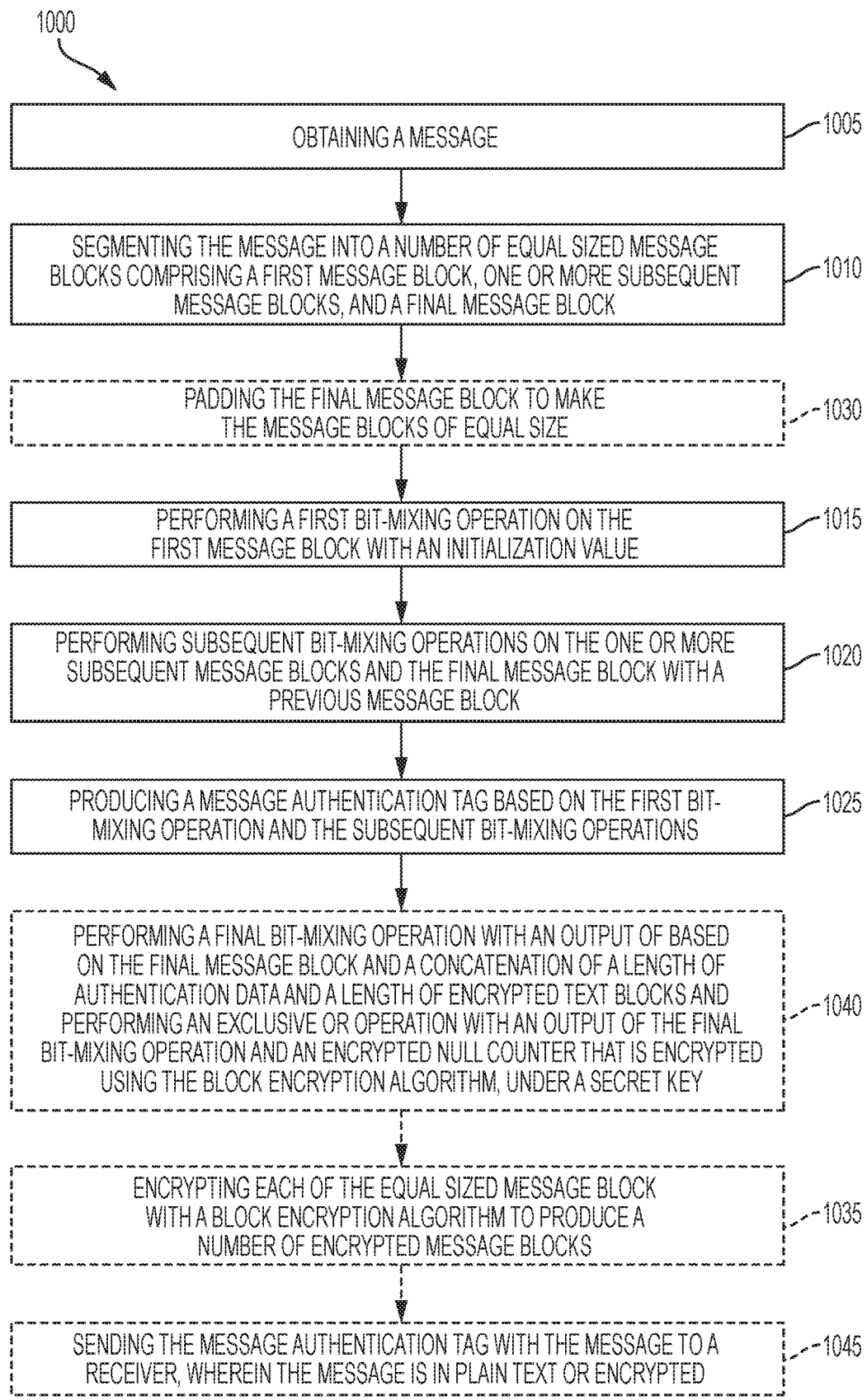
FIG. 10 illustrates a method 1000 for producing message authentication tag, according to examples of the present disclosure.

FIG. 10 illustrates a method 1000 for producing message authentication tag, according to examples of the present disclosure. The method begins by obtaining, at 1005, a message. The message can be any input or arbitrary data, like a dictionary entry, the content of a file, etc. The message can be in plaintext, cipher text (encrypted), or any arbitrary other type of data in electronic format. The method continues by segmenting, at 1010, the message into a number of equal sized message blocks comprising a first message block, one or more subsequent message blocks, and a final message block. The method continues by performing, at 1015, a first bit-mixing operation on the first message block with an initialization value. The method continues by performing, at 1020, subsequent bit-mixing operations on the one or more subsequent message blocks and the final message block with a previous message block. The method continues by producing, at 1025, the message authentication tag based on the first bit-mixing operation and the subsequent bit-mixing operations. The bit-mixing operations can be performed by the bit-mixer construction based on the double-mix Feistel network of FIGS. 5 and 6, the substitution-permutation network of FIG. 7, the XOR tree of FIG. 8; or the parallel combination of two or more bit-mixer constructions of FIG. 2.

In some examples, the method can further comprise padding, at 1030, the final message block to make the message blocks of equal size. In some examples, the method can further comprise encrypting, at 1035, each of the equal sized message blocks with a block encryption algorithm to produce a number of encrypted message blocks. In some examples, the method can further comprise performing, at 1040, a final bit-mixing operation with an output of based on the final message block and a concatenation of a length of authentication data and a length of encrypted text blocks and performing an exclusive OR operation with an output of the final bit-mixing operation and an encrypted null counter that is encrypted using the block encryption algorithm, under a secret key. In some examples, the method can further comprise sending, at 1045, the message authentication tag with the message to a receiver, where the message is in plain text or encrypted.

Figure 11:
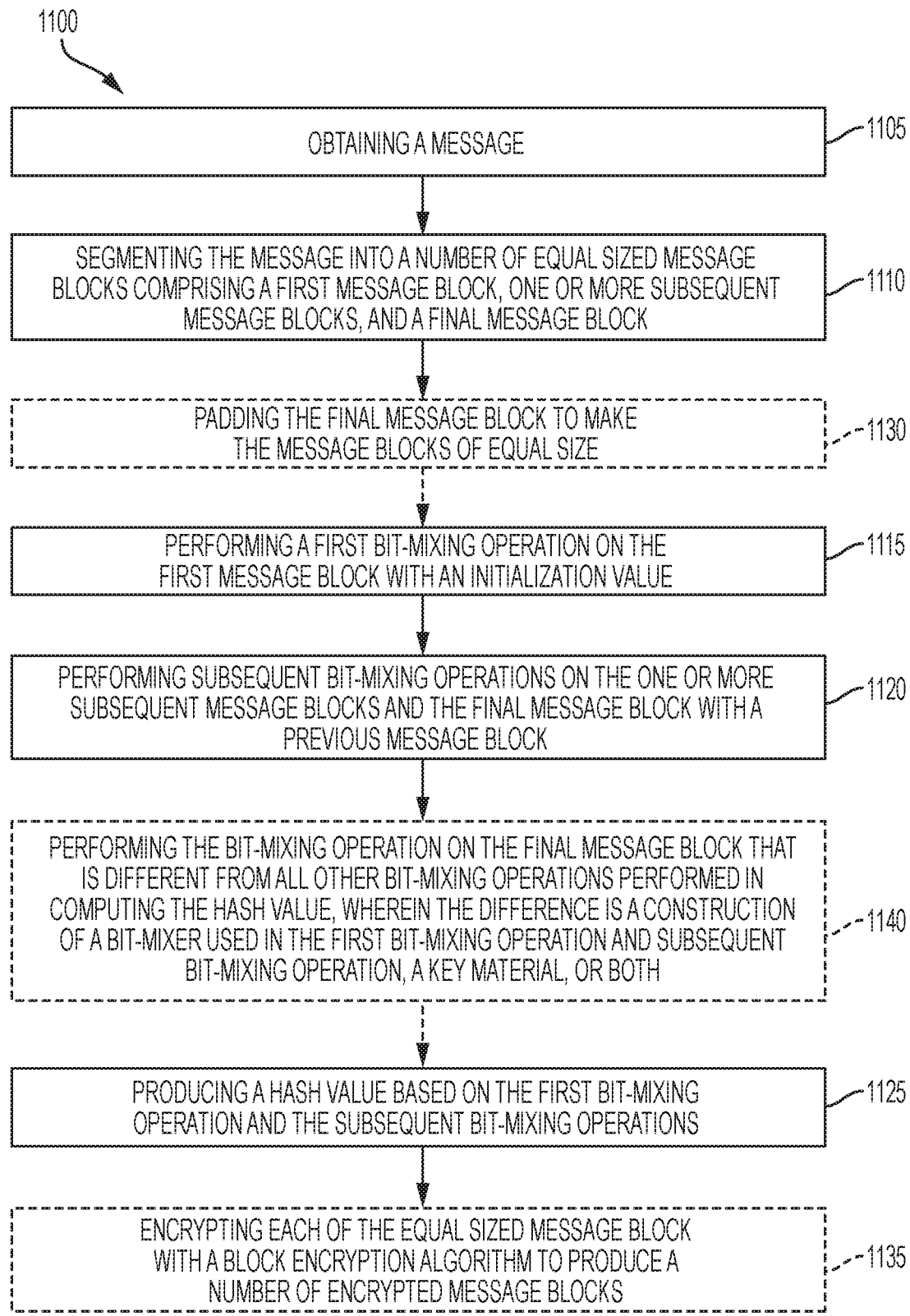
FIG. 11 illustrates a method 1100 for producing a hash value, according to examples of the present disclosure.

FIG. 11 illustrates a method 1100 for producing a hash value for a message, according to examples of the present disclosure. The method begins by obtaining, at 1105, the message. The message can be any input or arbitrary data, like a dictionary entry, the content of a file, etc. The message can be in plaintext, cipher text (encrypted), or any arbitrary other type of data in electronic format. The method continues by segmenting, at 1110, the message into a number of equal sized message blocks comprising a first message block, one or more subsequent message blocks, and a final message block. In some examples, the first message block, the one or more subsequent message blocks, and the final message block are encrypted message blocks. The method continues by performing, at 1115, a first bit-mixing operation on the first message block with an initialization value. The method continues by performing, at 1120, subsequent bit-mixing operations on the one or more subsequent message blocks and the final message block with a previous message block. The first bit-mixing operation and the subsequent bit-mixing operations use key material that is public. In some examples, the bit-mixing operations can be performed by the bit-mixer construction based on the double-mix Feistel network of FIGS. 5 and 6, the substitution-permutation network of FIG. 7, the XOR tree of FIG. 8; or the parallel combination of two or more bit-mixer constructions of FIG. 2. The method continues by determining, at 1125, the hash value based on the first bit-mixing operation and the subsequent bit-mixing operations.

In some examples, the method can further comprise padding, at 1130, the final message block to make the message blocks of equal size. In some examples, the method can further comprise encrypting, at 1135, each of the equal sized message blocks with a block encryption algorithm to produce a number of encrypted message blocks. In some examples, the method 1100 can further comprise performing, at 1140, the bit-mixing operation on the final message block that is different from all other bit-mixing operations performed in computing the hash value, wherein the difference is a construction of a bit-mixer used in the first bit-mixing operation and subsequent bit-mixing operation, a key material, or both. In some examples, the method 1100 can further comprising encrypting each of the equal sized message blocks with a block encryption algorithm to produce a number of encrypted message blocks.

Figure 12:
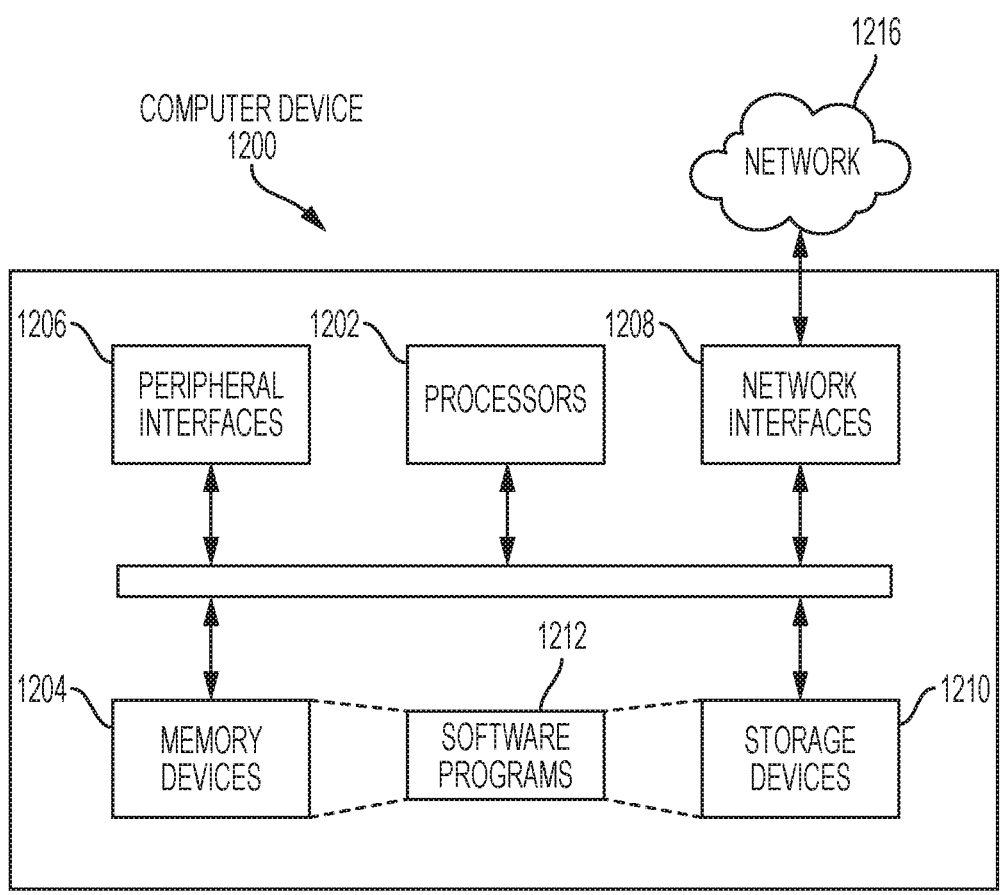
FIG. 12 illustrates an example of a hardware configuration for a computer device 1200 that can be used as mobile device or server, which can be used to perform one or more of the processes described above.

FIG. 12 illustrates an example of a hardware configuration for a computer device 1200 that can be used as mobile device or server, which can be used to perform one or more of the processes described above. While FIG. 12 illustrates various components contained in the computer device 1200, FIG. 12 illustrates one example of a computer device and additional components can be added and existing components can be removed.

The computer device 1200 can be any type of computer devices, such as desktops, laptops, servers, etc., or mobile devices, such as smart telephones, tablet computers, cellular telephones, personal digital assistants, etc. As illustrated in FIG. 12, the computer device 1200 can include one or more processors 1202 of varying core configurations and clock frequencies. The computer device 1200 can also include one or more memory devices 1204 that serve as a main memory during the operation of the computer device 1200. For example, during operation, a copy of the software that supports the above-described operations can be stored in the one or more memory devices 1204. The computer device 1200 can also include one or more peripheral interfaces 1206, such as keyboards, mice, touchpads, computer screens, touchscreens, etc., for enabling human interaction with and manipulation of the computer device 1200.

The computer device 1200 can also include one or more network interfaces 1208 for communicating via one or more networks, such as Ethernet adapters, wireless transceivers, or serial network components, for communicating over wired or wireless media using protocols. The computer device 1200 can also include one or more storage device 1210 of varying physical dimensions and storage capacities, such as flash drives, hard drives, random access memory, etc., for storing data, such as images, files, and program instructions for execution by the one or more processors 1202.

Additionally, the computer device 1200 can include one or more software programs 1212 that enable the functionality described above. The one or more software programs 1212 can include instructions that cause the one or more processors 1202 to perform the processes described herein. Copies of the one or more software programs 1212 can be stored in the one or more memory devices 1204 and/or on in the one or more storage devices 1210. Likewise, the data utilized by one or more software programs 1212 can be stored in the one or more memory devices 1204 and/or on in the one or more storage devices 1210.

In implementations, the computer device 1200 can communicate with other devices via a network 1216. The other devices can be any types of devices as described above. The network 1216 can be any type of network, such as a local area network, a wide-area network, a virtual private network, the Internet, an intranet, an extranet, a public switched telephone network, an infrared network, a wireless network, and any combination thereof. The network 1216 can support communications using any of a variety of commercially-available protocols, such as TCP/IP, UDP, OSI, FTP, UPnP, NFS, CIFS, AppleTalk, and the like. The network 1216 can be, for example, a local area network, a wide-area network, a virtual private network, the Internet, an intranet, an extranet, a public switched telephone network, an infrared network, a wireless network, and any combination thereof.

The computer device 1200 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1200 as described above need not be enclosed within a single enclosure or even located in close proximity to one another. Those skilled in the art will appreciate that the above-described componentry are examples only, as the computer device 1200 can include any type of hardware componentry, including any necessary accompanying firmware or software, for performing the disclosed implementations. The computer device 1200 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method that produces a message authentication tag, the method comprising:
    obtaining a message;
    segmenting, by an electronic processor, the message into a number of equal sized message blocks comprising a first message block, one or more subsequent message blocks, and a final message block;
    performing, by the electronic processor, an exclusive OR operation on the first message block, the one or more subsequent message blocks, and the final message block using a respective increasing encrypted counter value to yield a first ciphertext message block, one or more subsequent ciphertext message blocks, and a final ciphertext message block;
    performing, by the electronic processor, a first bit-mixing operation on the first ciphertext message block with an initialization value;
    performing, by the electronic processor, subsequent bit-mixing operations on the one or more subsequent ciphertext message blocks and the final ciphertext message block with a previous ciphertext message block, wherein the first bit-mixing operation and the subsequent bit-mixing operations are performed by a bit-mixer construction based on a double-mix Feistel network, a substitution-permutation network, or a parallel combination of two or more bit-mixer constructions; and
    producing, by the electronic processor, the message authentication tag based on the first bit-mixing operation and the subsequent bit-mixing operations.

2. The computer-implemented method of claim 1, further comprising encrypting each of the equal sized message blocks with a block encryption algorithm to produce a number of encrypted message blocks.

3. The computer-implemented method of claim 1, further comprising sending the message authentication tag with the message to a receiver, wherein the message is in plain text.

4. The computer-implemented method of claim 1, further comprising sending the message authentication tag with the message to a receiver, wherein the message is encrypted.

5. The computer-implemented method of claim 1, wherein the first bit-mixing operation and the subsequent bit-mixing operations are performed using a key material.

6. The computer-implemented method of claim 5, wherein the key material is kept secret and the message authentication tag is a message authentication code.

7. The computer-implemented method of claim 1, further comprising:
    performing a final bit-mixing operation with an output based on the final ciphertext message block and a concatenation of a length of authentication data and a length of encrypted text blocks; and
    performing an exclusive OR operation with an output of the final bit-mixing operation and an encrypted null counter that is encrypted using a block encryption algorithm, under a secret key.

8. The computer-implemented method of claim 1, further comprising padding the final message block to make the message blocks of equal size.

9. The computer-implemented method of claim 1, wherein each of the increasing encrypted counter value is encrypted using a block cipher encryption algorithm.

10. The computer-implemented method of claim 1, wherein the message authentication tag is a function based on a hash key, authenticated data, and a ciphertext.

11. The computer-implemented method of claim 10, wherein hash key is a string of 128 zero bits encrypted using a block cipher.

12. A computer-implemented method that produces a hash value for a message, the method comprising:
    obtaining the message;
    segmenting, by an electronic processor, the message into a number of equal sized message blocks comprising a first message block, one or more subsequent message blocks, and a final message block;
    performing, by the electronic processor, an exclusive OR operation on the first message block, the one or more subsequent message blocks, and the final message block using a respective increasing encrypted counter value to yield a first ciphertext message block, one or more subsequent ciphertext message blocks, and a final ciphertext message block;
    performing, by the electronic processor, a first bit-mixing operation on the first ciphertext message block with an initialization value;
    performing, by the electronic processor, subsequent bit-mixing operations on the one or more subsequent ciphertext message blocks and the final ciphertext message block with a previous ciphertext message block, wherein the first bit-mixing operation and the subsequent bit-mixing operations are performed by a bit-mixer construction based on a double-mix Feistel network, a substitution-permutation network, or a parallel combination of two or more bit-mixer constructions; and producing, by the electronic processor, the hash value based on the first bit-mixing operation and the subsequent bit-mixing operations.

13. The computer-implemented method of claim 12, wherein the first bit-mixing operation and the subsequent bit-mixing operations use key material that is public.

14. The computer-implemented method of claim 12, further comprising performing a final bit-mixing operation on the final ciphertext message block, the final bit-mixing operation being different from the first bit-mixing operation and the subsequent bit-mixing operations performed in computing the hash value, wherein a difference is a construction of a bit-mixer used in the first bit-mixing operation and the subsequent bit-mixing operations, a key material, or both.

15. The computer-implemented method of claim 12, further comprising encrypting each of the equal sized message blocks with a block encryption algorithm to produce a number of encrypted message blocks.

16. The computer-implemented method of claim 12, wherein the electronic processor is further configured to perform a final bit-mixing operation on the final ciphertext message block, the final bit-mixing operation being different from the first bit-mixing operation and the subsequent bit-mixing operations performed in computing the hash value, wherein a difference is a construction of a bit-mixer used in the first bit-mixing operation and the subsequent bit-mixing operations, a key material, or both.

17. The computer-implemented method of claim 12, wherein the electronic processor is further configured to encrypt each of the equal sized message blocks with a block encryption algorithm to produce a number of encrypted message blocks.

18. A computer system comprising:
an electronic processor;
a non-transitory computer readable medium storing instructions that when executed by the electronic processor, perform a method for producing a message authentication tag, the method comprising:
obtaining a message;
segmenting the message into a number of equal sized message blocks comprising a first message block, one or more subsequent message blocks, and a final message block;
performing, by the electronic processor, an exclusive OR operation on the first message block, the one or more subsequent message blocks, and the final message block using a respective increasing encrypted counter value to yield a first ciphertext message block, one or more subsequent ciphertext message blocks, and a final ciphertext message block;
performing a first bit-mixing operation on the first ciphertext message block with an initialization value;
performing subsequent bit-mixing operations on the one or more subsequent ciphertext message blocks and the final ciphertext message block with a previous ciphertext message block, wherein the first bit-mixing operation and the subsequent bit-mixing operations are performed by a bit-mixer construction based on a double-mix Feistel network, a substitution-permutation network, or a parallel combination of two or more bit-mixer constructions; and producing the message authentication tag based on the first bit-mixing operation and the subsequent bit-mixing operations.

19. The computer system of claim 18, wherein the electronic processor is further operable to perform the method comprising:
performing a final bit-mixing operation with an output based on the final ciphertext message block and a concatenation of a length of authentication data and a length of encrypted text blocks; and
performing an exclusive OR operation with an output of the final bit-mixing operation and an encrypted null counter that is encrypted using a block encryption algorithm.

20. The computer system of claim 18, wherein each of the increasing encrypted counter value is encrypted using a block cipher encryption algorithm.

21. The computer system of claim 18, wherein the message authentication tag is a function based on a hash key, authenticated data, and a ciphertext.

22. A computer system comprising:
an electronic processor;
a non-transitory computer readable medium storing instructions that when executed by the electronic processor, perform a method for producing a hash value, the method comprising:
obtaining a message;
segmenting the message into a number of equal sized message blocks comprising a first message block, one or more subsequent message blocks, and a final message block;
performing, by the electronic processor, an exclusive OR operation on the first message block, the one or more subsequent message blocks, and the final message block using a respective increasing encrypted counter value to yield a first ciphertext message block, one or more subsequent ciphertext message blocks, and a final ciphertext message block;
performing a first bit-mixing operation on the first ciphertext message block with an initialization value;
performing subsequent bit-mixing operations on the one or more subsequent ciphertext message blocks and the final ciphertext message block with processed previous ciphertext message block, wherein the first bit-mixing operation and the subsequent bit-mixing operations are performed by a bit-mixer construction based on a double-mix Feistel network, a substitution-permutation network, or a parallel combination of two or more bit-mixer constructions; and
producing the hash value based on the first bit-mixing operation and the subsequent bit-mixing operations.

23. The computer system of claim 22, wherein the electronic processor is further operable to perform the method comprising:
performing a final bit-mixing operation with an output based on the final ciphertext message block; and
performing the final bit-mixing operation with a bit-mixer that is different from the first bit-mixing operation and the subsequent bit-mixing operations in the producing of the hash value.

24. The computer system of claim 21, wherein hash key is a string of 128 zero bits encrypted using a block cipher.

* * * * *